July 8, 1952 R. DE LISO 2,602,366
POCKET REFLEX VIEWER
Filed March 14, 1949
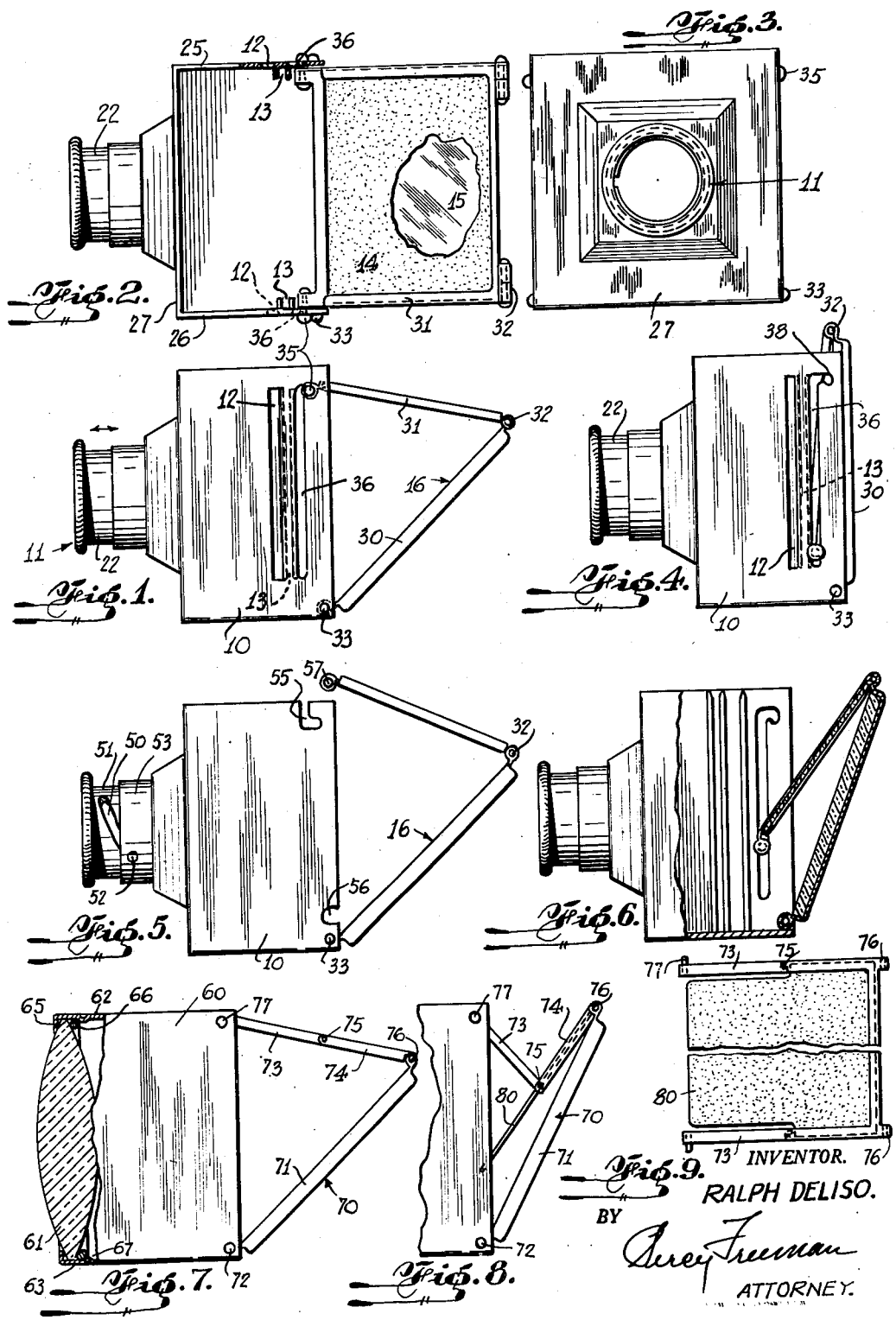
INVENTOR.
RALPH DELISO.
BY
ATTORNEY.

Patented July 8, 1952

2,602,366

UNITED STATES PATENT OFFICE 2,602,366

POCKET REFLEX VIEWER

Ralph De Liso, Astoria, N. Y.

Application March 14, 1949, Serial No. 81,315

1 Claim. (Cl. 88—1)

My invention relates in general to optical viewers, and is directed more particularly to that type of viewer which may be used to examine frames of photographic film, slides and the like, and which may be of such a size that it will fit easily into the pocket.

Apparatus of the general art to which this invention pertains has been known heretofore and a number of different forms thereof have been disclosed. All of these have evidenced disadvantages which are overcome by the arrangement of the present invention.

It is an object of my invention to provide a folding or collapsible type of viewer in which a well-lighted, large-sized view of a transparency may be obtained and further which may be viewed from such a position that awkward viewing positions are eliminated.

It is a further object of my invention to provide a view-finder which tends to give a three-dimensional effect to transparencies viewed therethrough.

It is an additional object to provide a collapsible viewer having an improved folding mechanism.

It is still further object of my invention to provide a viewer which will accommodate slides or film of differing thicknesses and other varying dimensions.

It is a major object of the invention to provide a viewer for viewing transparencies in which a lens of such dimensions is provided that the viewer may rest easily in the hand and the transparency may be viewed without squinting into a relatively small eyepiece.

It is a further object of my invention to provide a collapsible type of viewing apparatus which is simple and rugged in construction, easy to manufacture, and further which may be manufactured at a reasonable cost and which is extremely simple to use.

My invention in general contemplates the provision of a casing member or housing into which are placed the slides or other transparencies such as photographic film frames, and the like, and at the front end of the casing or housing, there is provided a lens member through which the transparencies are viewed. In one form of my invention, the lens member is of substantially the same size as the front of the case and this makes the observation of the transparency comparatively simple without the necessity of having the viewer look through a normal lens-holding tube.

The casing itself is provided with slots of different widths so that slides of different thicknesses may be accommodated.

At the rear of the casing, there is provided a translucent light diffusing member and a reflecting member. The reflecting member is hinged to the casing at the lower portion thereof and the translucent member is hinged to the reflecting member. Additionally, slots or other appropriate means are provided in the casing by means of which the translucent member may be guided into a proper operative position and held there when the device is being used. The moving into an operative position of the translucent member also moves the reflecting member to the proper position wherein light from an external light source is directed through the translucent light diffusing member onto the reflecting member and thence through the transparency to be viewed. The light directing system of the present invention, therefore, is collapsible in nature and is novel in construction.

My invention, therefore, consists in the provision of a collapsible viewer, through which slides or other transparencies may be viewed, which has a novel arrangement of cooperating light directing elements, the latter being so constructed that when easily, manually directed into an operative position, the light is directed through the transparency being viewed. In an alternative form thereof, it consists in the combination of the foregoing with a large size lens for rendering viewing very simple and superior to those arrangements of the prior art.

My invention will be understood best by reference to the drawings, in which:

Fig. 1 is a side view of the preferred form of this invention, showing it in extended or operative position.

Fig. 2 is a top view thereof, broken away in two places.

Fig. 3 is a front view thereof.

Fig. 4 is a side view, similar to that of Fig. 1, but showing it in folded or portable position.

Fig. 5 is a side view of a second form of this invention, showing the viewer in extended but not operative position.

Fig. 6 is a side view, partly broken away and partly in vertical section, of a third form of this invention, this form being similar to the preferred form in all respects except in the construction of the slots in which the pins of the extensible, mirror-carrying frame, travel.

Fig. 7 is a side view of still another form of this invention, wherein the lens is substantially as large as the slide.

Fig. 8 is a fragmentary view of said last-mentioned form of the invention, showing the mirror-carrying frame in partly folded position.

Fig. 9 is a face view of the mirror and mirror frame of said last-mentioned form of this invention.

Referring now to the first four figures of the drawing, it will be seen that the first form of this invention includes a housing or casing 10, a lens 11, slits 12, 36, and slide grooves 13, formed by the metal bent from the walls of the casing 10, which is adapted to accommodate the slides, a glass or other light diffusing window 14 which is translucent, a mirror 15, and a foldable frame 16 which supports said window and said mirror on said casing, which is substantially rectangular in shape.

It will be noted that while slide grooves 13 are provided for the accommodation of slides, there have also been provided the slits 12, through which may be threaded a motion picture film so that any one frame of the film may be viewed in the device.

Since the slits 12 and the grooves 13 are positioned a different distance from the front of the casing where the lens is situated, the lens may be telescopically mounted on said casing by means of telescopic mounting 22. It is thereby possible to adjust the distance between the lens and the grooves and the lens and the slits 12, thereby providing a choice of focal lengths irrespective of whether the grooves or the slits are being used.

Casing 10 may constitute a plastic molding, if desired, and in such case its flanges 20 may be integral with its side walls 25 and 26, respectively. A rather sizable space is provided between the front flanges 20 and the front wall 27 of the casing. This space may be utilized for storing a plurality of slides when the viewer is not in actual use. However, if it be desired to make the device smaller, the storage feature may be dispensed with.

Foldable frame 16 comprises a pair of frame members 30 and 31, respectively, which are hingedly connected to each other by means of hinge 32. Frame member 30 is also hingedly connected to the back of casing 10 by means of hinge 33. It is, therefore, possible for the two members 30 and 31 to fold flat upon each other and for both to fold flat against the rear of the casing, or slightly inside the casing. To hold these frame members in extended or operative position, pins 35 are provided at the free end of frame member 31 and slots 36 are provided in the side walls of the casing to accommodate said pins. These slots extend vertically of the casing and at their upper ends they are provided with hook-shaped portions 38. The pins of the foldable frame are adapted to move vertically in the vertically extending slots but when they are brought into the hook-shaped ends of said slots, further vertical movement of said pins is precluded. In this position, the angular relationship between the light diffusing member 31 and the reflecting member 30 is correctly adjusted so that light from an external source is directed through the slide to provide optimum light conditions for viewing the slide through the lens.

Thus it is that when the foldable frame member 16 is unfolded until it occupies its operative position of Figs. 1 and 2, and until its pins 35 enter and occupy the hook-shaped ends of slots 36, a locking effect takes place which holds said frame in said position until such time as its pins are caused to disengage said hook-shaped slot portions and to slide downwardly along said slots 36. When these pins reach the bottom ends of said slots, the foldable frame occupies its folded position at the back of the casing.

It will be noted that frame 30 carries reflector 15, and that frame member 31 carries the translucent window 14. This translucent window permits light but not images to impinge upon the mirror and the mirror is so positioned in its operative position to reflect this light through the slide and thence through the lens.

It will be appreciated that alternatively the translucent member could be hingedly associated with the casing or housing and that the reflecting member could be provided with pins to engage in the slots such as slot 36. The form of the invention illustrated in the drawings is, however, considered by me to be the preferred form.

It will be appreciated also that by hingedly connected I mean a pivotal connection whether the device used be an actual hinge in its restricted sense or not.

In only one respect does the slide viewer shown in Fig. 6 differ from that shown in Figs. 1 to 4 inclusive. In the slide viewer first above described, slots 36 extend wholly through the side walls of the casing, as do the pins which travel in said slots. In the slide viewer shown in Fig. 6, however, slots 40 which correspond to slots 36, do not extend wholly through the walls of the casing, and hence they may be more correctly and precisely described as grooves rather than as slots. These grooves may be formed in the casing by means of the same molding process by which the casing is itself made.

The slide viewer shown in Fig. 5 differs in two respects from the two slide viewers above described. In the first two forms of this invention, the lens is telescopically mounted on the front wall of the casing in such manner that it may be pushed or pulled into any desired position relative to the slide. In the present embodiment, however, a spiral slot 50 is provided in the movable part 51 of the lens housing and a fixed pin 52 is provided in the stationary part 53 of the lens housing, said pin being in engagement with said slot in the usual manner. Hence, when the movable part of the lens housing is turned on its longitudinal axis, telescopic or linear movement of said movable part of the lens housing is thereby effected. A more accurately controlled adjustment of the lens may thereby be had than is available through the instrumentality of the telescopic construction of the first two forms of the invention.

Secondly, the slide viewer of Fig. 5 does not have the slots 36 of the first form of the invention or the grooves 40 of the second form of the invention. Instead, it is provided with a pair of bayonet slots 55 at the top of its side walls and with a pair of slots 56 at the back of said side walls, adjacent their lower ends. Pins 57 of the foldable frame 16 of the instant form of the invention, corresponding to pins 35 of the first form of the invention, are brought into engagement with bayonet slots 55 when it is desired to hold said foldable frame in extended or operative position, and they are brought into engagement with slots or notches 56 when it is desired to bring said foldable frame into folded or inoperative position.

The form of invention shown in Figs. 7, 8 and 9 differs from the aforementioned forms of the invention in several respects. In the first place, its casing 60 has a large lens 61 fixed therein, in its front wall, and said lens is substantially as large as the casing will permit. As seen in Fig. 7, the top and bottom of the lens actually abut the top and bottom walls 62 and 63, respectively, of the casing. For the purposes of the present form of the invention, it is assumed that the dimensions of the casing correspond to the dimensions of the slides, and hence, the dimensions of the lens also correspond, substantially, to the dimensions of the slides. More precisely, the diameter of the lens (if a circular lens is used) corresponds substantially to the width of the slides and perhaps also to their height. In any case, however, the diameter of the lens is at least substantially equal to the length or height of the slides, whichever of these two latter dimensions happens to be larger.

With this arrangement, observation of the transparency is comparatively simple and eliminates the necessity for having the viewer look through a conventional lens-holding tube.

It will be noted that flanges 65 are provided in the front of casing 60. These flanges serve as retaining members for the lens and a retaining ring 66 is provided to cooperate with said flanges to hold the lens in place. This retaining ring may be of the spring tension type, and it may be snapped into place against the back of the lens and between said lens and bead 67 formed on the inside of the casing.

Foldable frame 70 is similar to the foldable frames above described, in that its mirror supporting member 71 is hingedly connected by means of hinge 72 to the casing. The window-supporting frame, however, comprises a pair of frame members 73 and 74, respectively, said members being hingedly connected to each other at 75, member 74 being hingedly connected to member 71 at 76 and member 73 being hingedly connected to the upper end of the casing at 77. Hence, it is that members 73 and 74 are foldable upon each other at the same time that said members are foldable upon frame member 71. Window 80 which is translucent rather than transparent, and which may be made of glass or plastics is affixed solely to frame member 74 as is clearly shown in Fig. 8. Hence, when frame members 73 and 74 are folded upon each other, window 80 is at the same time brought into juxtaposition against the mirror which is carried by frame member 71. It will be clear from the foregoing that by reason of this construction, there is no need for the provision of slots or grooves corresponding to slots 36 and grooves 40.

It will be apparent from the foregoing that modifications may be incorporated into the forms of invention above described within the broad principles of the invention. For example, the type of casing shown in Fig. 1 may be used in conjunction with the type of lens shown in Fig. 7, and conversely, the type of mirror and window frame structure shown in Fig. 7 may be used in conjunction with the type of lens structure shown in Fig. 1. Obviously, too, the lens 61 in Fig. 7 may be movably mounted with respect to the view being examined, like in Fig. 5. Similar and other variations are equally possible within the scope of this invention.

Having thus described my invention, what I claim as new and desire to secure by Letters Patent, is:

A device for viewing images recorded on a light pervious material, comprising a casing, opposed guide grooves on the inside of the casing to accommodate said image-carrying material, a lens at the front of said casing with its optical axis normal to the plane of the image-carrying material, and an articulated frame pivotally connected at the back of said casing, said frame having mounted on one section thereof a translucent window and on another section thereof, a mirror in such positions relative to each other and to the slide and lens as to enable light to pass through said translucent window and to be reflected by said mirror through the slide and lens, said sections of the articulated frame being foldable upon each other at the rear of the casing into collapsed inoperative position, said casing having a pair of opposed vertical slots therein, said window-carrying section having at one end oppositely extending lateral projections engaged in said slots and adapted to move therein to be guided thereby, the ends of said slots terminating in L-shaped formation for lockingly retaining said slot-engaging projections to releasably hold the respective sections in extended adjusted position.

RALPH DE LISO.

REFERENCES CITED

The following references are of record in the file of this patent:

UNITED STATES PATENTS

| Number | Name | Date |
|---|---|---|
| 1,144,074 | Speidel | June 22, 1915 |
| 2,227,898 | Grant | Jan. 7, 1941 |

FOREIGN PATENTS

| Number | Country | Date |
|---|---|---|
| 732,101 | France | June 6, 1932 |